United States Patent
Xia et al.

(10) Patent No.: US 9,516,131 B2
(45) Date of Patent: Dec. 6, 2016

(54) MEDIA PLAYBACK PROFILE MAPPING

(71) Applicant: Verizon Patent and Licensing Inc., Basking Ridge, NJ (US)

(72) Inventors: Wei Xia, Sudbury, MA (US); Yuhui Qian, Lexington, MA (US); Jack Jianxiu Hao, Lexington, MA (US); Zhiying Jin, Lexington, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 476 days.

(21) Appl. No.: 13/904,530

(22) Filed: May 29, 2013

(65) Prior Publication Data

US 2014/0358989 A1 Dec. 4, 2014

(51) Int. Cl.
*G06F 15/16* (2006.01)
*H04L 29/08* (2006.01)

(52) U.S. Cl.
CPC ......... *H04L 67/303* (2013.01); *H04L 67/2814* (2013.01)

(58) Field of Classification Search
USPC .......................................................... 709/203
See application file for complete search history.

(56) References Cited

U.S. PATENT DOCUMENTS

| | | | |
|---|---|---|---|
| 2005/0083899 A1* | 4/2005 | Babbar | H04W 88/06 370/342 |
| 2007/0203732 A1* | 8/2007 | Griegel | G06Q 30/02 705/75 |
| 2011/0047031 A1* | 2/2011 | Weerasinghe | 705/14.66 |
| 2011/0252082 A1* | 10/2011 | Cobb | H04L 65/605 709/203 |

* cited by examiner

*Primary Examiner* — Kristie Shingles
*Assistant Examiner* — Mohammad Yousuf A Mian

(57) ABSTRACT

A network device stores a mapping configuration to associate client type profiles with particular delivery profiles for media content and receives, from a client device, a request for a link to a content selection. The request includes a content identifier and parameters for the client device. The network device constructs, based on the parameters for the client device, a particular client type profile and maps the particular client type profile to one of the particular delivery profiles in the mapping configuration. The network device constructs a uniform resource locator (URL), based on the one of the particular delivery profiles and the content identifier, that provides the link to the content selection with formatting that is suitable for the particular client type profile and sends the URL to the client device.

19 Claims, 10 Drawing Sheets

FIG. 5

MAPPING DEFINITION FORMAT

510 → `<DeviceSpec>`
520 → `<Spec>{device spec with access type}_{HD/SD}_{download/streaming}</Spec>`
530 → `<Type>{media profile}{media sub profile}</Type>`
510 → `</DeviceSpec>`

```
<Configuration>
    <DeviceDeliverySpecMapping>
        <DeviceSpec>
            <Spec>IPA_3_3G_streaming</Spec>
            <Type>HLS_SM_SD_MOBILE_A</Type>
        </DeviceSpec>
        <DeviceSpec>
            <Spec>IPA_DEFAULT_3G_streaming</Spec>
            <Type>HLS_SM_SD_MOBILE_A</Type>
        </DeviceSpec>
        <DeviceSpec>
            <Spec>ANT_GALAXY_WIFI_streaming</Spec>
            <Type>HLS_SM_SD_MOBILE_A</Type>
        </DeviceSpec>
        <DeviceSpec>
            <Spec>IPH_DEFUALT_3G_download</Spec>
            <Type>iPHONE</Type>
        </DeviceSpec>
        <DeviceSpec>
            <Spec>SAM_TV_SD_streaming</Spec>
            <Type>HLS_SM_SD_CE_DEVICES</Type>
        </DeviceSpec>
        <DeviceSpec>
            <Spec>SAM_TV_SD_streaming</Spec>
            <Type>HLS_SM_SD_CE_DEVICES</Type>
        </DeviceSpec>
        <DeviceSpec>
            <Spec>XBO_MS_HD_streaming</Spec>
            <Type>SMOOTH_HD</Type>
        </DeviceSpec>
        <DeviceSpec>
            <Spec>WEB_streaming</Spec>
            <Type>SMOOTH_%format%</Type>
        </DeviceSpec>
        ...
    </DeviceDeliverySpecMapping>
    ...
</Configuration>
```

600

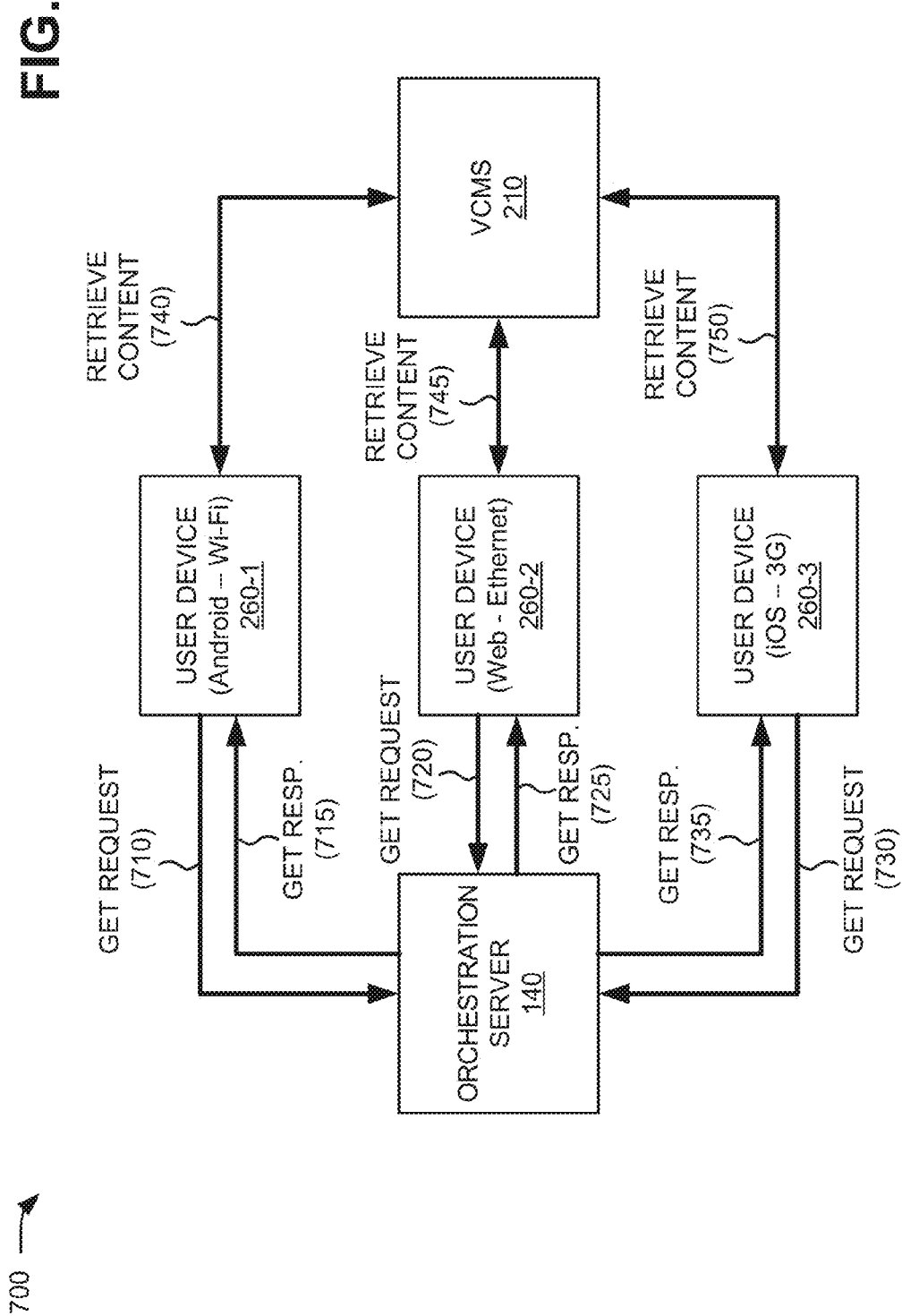

FIG. 8

```
GetPlaybackUrl Request:
<Zoe>
    <TransactionInfo>
        <TransactionID>28b65943-e55e-4d39-93e0-05d0961d157e</TransactionID>
        <TransactionTime>2013-02-19T04:34:28.082-04:34</TransactionTime>
        <TransactionAccessPoint>JVPWEB</TransactionAccessPoint>
        <Format>xml</Format>
        <TransactionDeviceID>WEB</TransactionDeviceID>
    </TransactionInfo>
    <RequestInfo>
        <Event>GetPlaybackUrl</Event>
        <PartnerCustomerNumber>358501777931885</PartnerCustomerNumber>
        <PurchaseOptionID>TVNX00172314013855520-000001</PurchaseOptionID>
        <DeviceID>e1cf7acb4df6ea687419dc9a2bb856e4</DeviceID>
        <DeviceSpec>ANT_GALAXY_WIFI</DeviceSpec>
        <IsDownload>False</IsDownload>
    </RequestInfo>
</Zoe>
```

GetPlaybackUrl response:
```
<?xml version="1.0" encoding="UTF-8"?>
<ZoeResponse>
  <ResultInfo>
    <ResultCode>0</ResultCode>
    <ResultMessage>Success</ResultMessage>
  </ResultInfo>
  <CDNURL>http://ztt.provider.net/movies/his/DEFE135723445_HLS/DEFE135723445_MOBILE_A.m3u8</CDNURL>
  <ProgressWatched>1980000</ProgressWatched>
  <ComponentID>8b5d5e6f-4f3b-a1b9-01e89f2cb</ComponentID>
  <EntitlementID>c51acf18-6344-4ab9-8e65-9db1d885af5a</EntitlementID>
  <Token>d58d6c69d35e4ccbaf560a8ab2f583ff</Token>
  <ScrubberInterval/><ScrubberPath/>
</ZoeResponse>
```

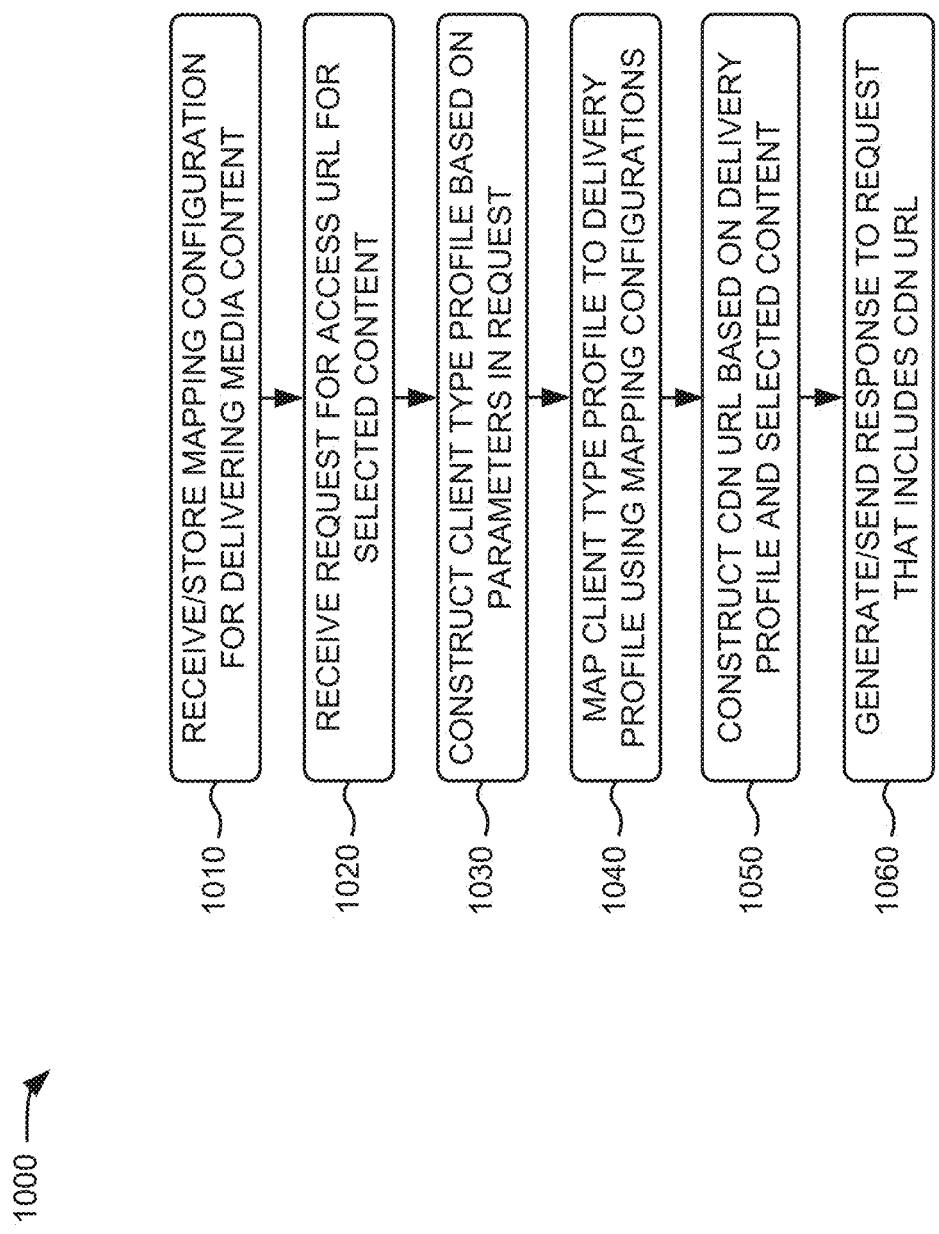

MEDIA PLAYBACK PROFILE MAPPING

BACKGROUND

Media playback services may be provided to a variety of devices, including mobile devices and fixed devices that are configured to receive media via the Internet. Service providers may seek to determine an optimal format for providing media to individual devices. Multiple factors may influence these determinations, such as the type of device, the type of connection, and the type of software.

BRIEF DESCRIPTION OF THE DRAWINGS

FIG. 5 is a diagram of an exemplary mapping definition format according to an implementation described herein;

FIG. 6 is a diagram of a portion of an exemplary configuration file for mapping definitions according to an implementation described herein;

FIG. 7 is a diagram of exemplary communications among a portion of the network of FIG. 2;

FIG. 8 is an exemplary get request used in the communications of FIG. 7, according to an implementation described herein;

FIG. 9 is an exemplary get response used in the communications of FIG. 7, according to an implementation described herein; and FIG. 10 is a flowchart of exemplary processes for mapping a content delivery profile to a requesting client device type, according to an implementation described herein.

DETAILED DESCRIPTION OF PREFERRED EMBODIMENTS

The following detailed description refers to the accompanying drawings. The same reference numbers in different drawings may identify the same or similar elements.

Figure 1:
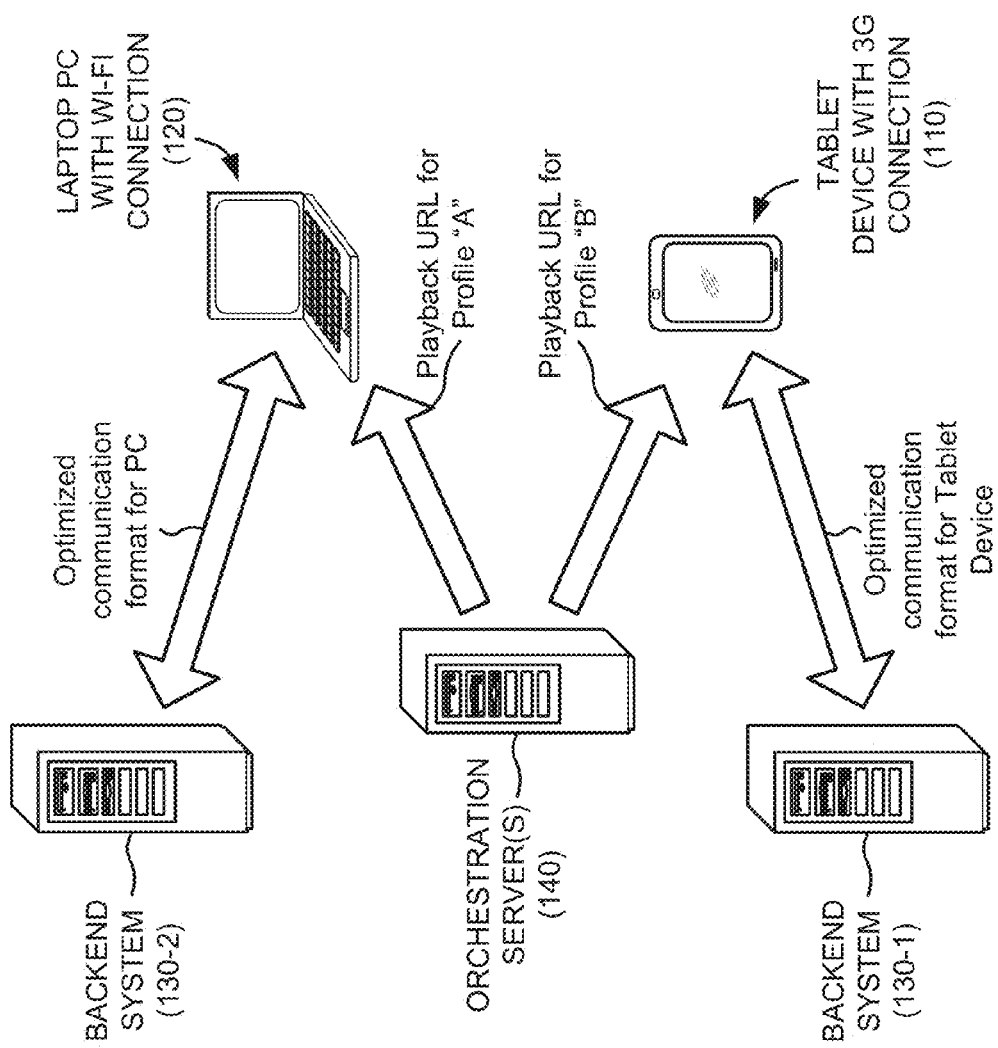
FIG. 1 is an illustration of a concept described herein.

Systems, and/or methods described herein may provide a configurable mapping table for constructing a proper media playback uniform resource locator (URL) in response to requests, from device clients, for media content. FIG. 1 provides an illustration of concepts described herein. Referring to FIG. 1, different types of user devices (e.g., a tablet device 110 and a laptop computer 120) may use different connection protocols, operating system, etc. to access media content via the Internet. Backend systems, such as backend systems 130-1 and 130-2, may provide services (e.g., Internet-based services, such as video content distribution services) to the user devices. These services may be optimized for presentation to a user based on the particular combination of features and connection protocols associated with a particular requesting user device (e.g., tablet device 110 or laptop computer 120). For example, backend system 130-1 may provide requested content in a format optimized for a mobile device using a 3G network (as defined by the Third Generation Partnership Project (3GPP)). By contrast, backend system 130-2 may provide requested content in a format optimized for a PC using a Wi-Fi network.

An orchestration sever 140 may provide a proxy service (e.g., a server layer) linking a client application on user devices 110/120 with desired backend systems 130. Orchestration sever 140 may store a variety of delivery profiles that may distinguish, for example, between proprietary adaptive bit rate (ABR) streaming formats and/or media quality (e.g., standard definition (SD) or high definition (HD). Orchestration sever 140 may also store a variety of client type profiles that correspond to, for example, capabilities of particular user devices (e.g., tablet device 110, laptop computer 120, etc.) and/or their connection types to receive particular media formats. Orchestration sever 140 may include a media playback mapping configuration with a collection of all the mappings between each client type profile and each delivery profile. When requesting particular media content to present to a user, the user devices (e.g., tablet device 110, laptop computer 120, etc.) may provide a client type profile with a standardized format. Orchestration server 140 may map the client type profile to a particular delivery profile and use the matched delivery profile to configure a media playback URL to provide the requested content in an optimal format for the requesting user device.

Figure 2:
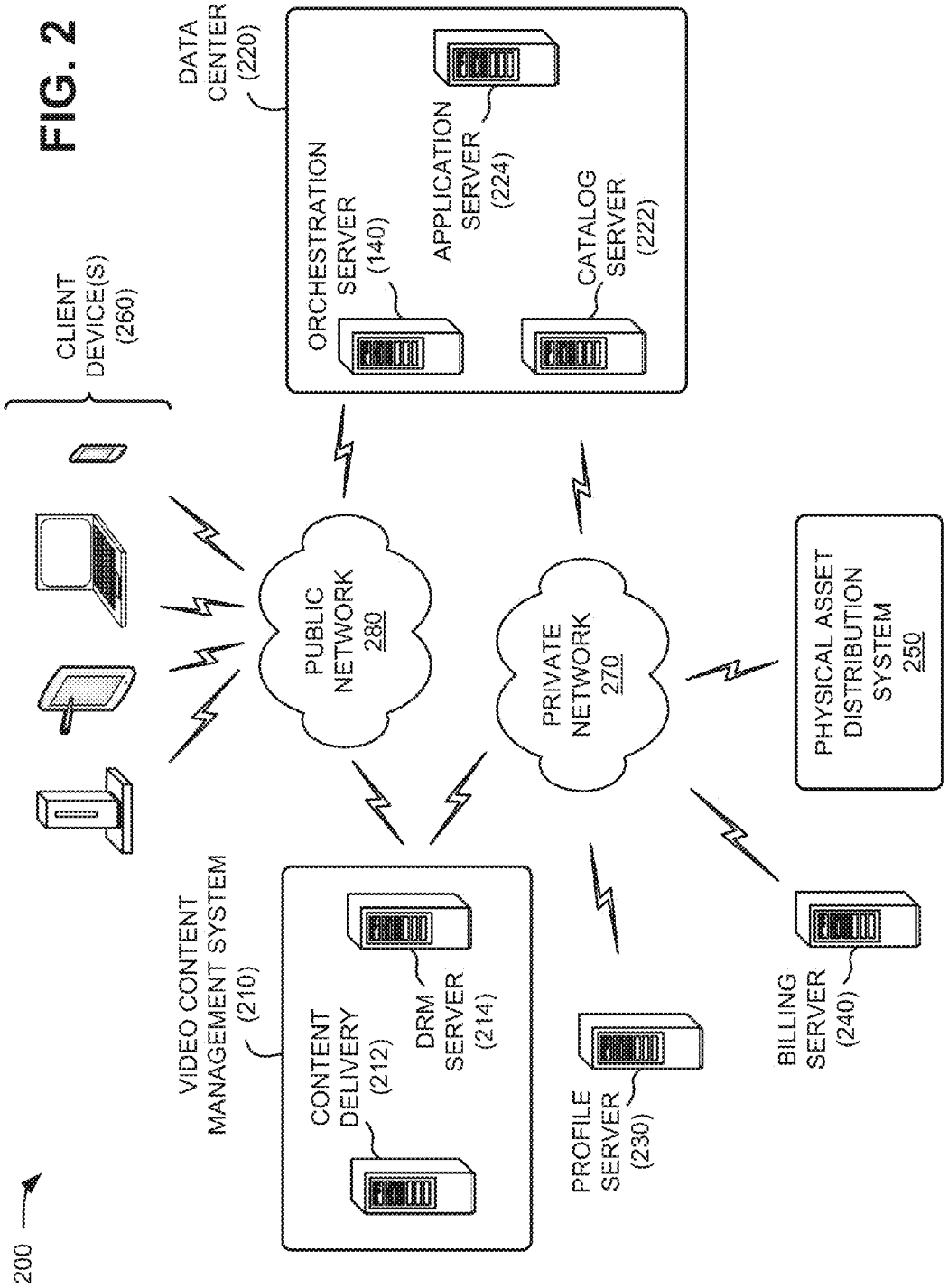
FIG. 2 is a diagram of an exemplary network in which systems and/or methods described herein may be implemented.

FIG. 2 is an exemplary network 200 in which concepts described herein may be implemented. Network 200 may generally represent client devices connected to a video content distribution network. As illustrated, network 200 may include a video content management system (VCMS) 210, a data center 220, a profile server 230, a billing server 240, a physical asset distribution system 250, client devices 260, a private network 270, and a public network 280. The particular arrangement and number of components of network 200 shown in FIG. 2 are illustrated for simplicity. In practice there may be more video content management systems 210, data centers 220, profile servers 230, physical asset distribution systems 250, client devices 260, and/or networks 270/280. Components of network 200 may be connected via wired and/or wireless links.

VCMS 210 may include one or more network devices, or other types of computation or communication devices, to aggregate content and content metadata, process content, and distribute content. In one implementation, VCMS 210 may include a content delivery system 212 and a digital rights management (DRM) server 214. VCMS 210 may aggregate content and transcode content into a digital format suitable for consumption on particular client devices 260. For example, VCMS 210 may include a transcoding device to convert a video file from one format to another (e.g., from one bit rate to another bit rate, from one resolution to another, from one standard to another, from one file size to another, etc.). VCMS 210 may also encrypt data and communicate with DRM server 214 to enforce digital rights.

Content delivery system 212 may include one or more network devices, or other types of computation or communication devices, to deliver digital content to client devices 260. In one implementation, content delivery system 212 may include a streaming server that provides streaming data packets (e.g., via a media playback URL) to client devices 260 (e.g., via network 280). In one implementation, a media playback URL may be session-based, such that each URL can be used only once for one client device 260 for security purposes.

DRM server 214 may include one or more network devices, or other types of computation or communication devices, to issue, validate, and/or enforce DRM licenses to a client, such as an application running on one of client devices 260. In implementations herein, DRM server 214 may communicate with client device 260 to authenticate a user of client device 260, the particular client device 260, and/or an application residing on client device 260. For example, DRM server 214 may request/receive login information associated with the user, and compare the login information with stored information to authenticate the user. Additionally, or alternatively, DRM server 214 may request/receive device information (e.g., a unique device identifier) associated with client device 260, and may compare the device information with stored information to authenticate client device 260.

Data center 220 may include one or more network devices, or other types of computation or communication devices, to manage the authorization, selection, and/or purchase of multimedia content by a user of client devices 260. As shown in FIG. 2, data center 220 may include orchestration server 140, a catalog server 222 and an application server 224. In one implementation, data center 220 may be accessed by client devices 260 via public network 280.

Catalog server 222 may include one or more network devices, or other types of computation or communication devices (e.g., a server device, an application server device, a Web server device, a database server device, a computer, etc.), to provide a unified catalog of both digital and physical content for users (e.g., of client devices 260) to consume (e.g., buy, rent, or subscribe). In one implementation, catalog server 222 may collect and/or present listings of video content available to client devices 260. For example, catalog server 222 may receive digital and/or physical content metadata, such as lists or categories of content, from VCMS 210 and/or physical asset distribution system 250. Catalog server 222 may use the content metadata to provide currently-available content options to client devices 260. Catalog server 222 may provide the content metadata to client device 260 directly or may communicate with client device 260 via application server 224.

Application server 224 may include one or more network devices, or other types of computation or communication devices (e.g., a server device, an application server device, a Web server device, a database server device, a computer, etc.), to provide a backend support system for mobile applications residing on client devices 260. For example, application server 224 may permit client device 260 to download a video application that may permit a user to find content of interest or play downloaded or streaming content. The video application may enable client device 260 to present information received from data center 220 to a user of client device 260 in an interactive format to allow selection of particular digital or physical content. Additionally, or alternatively, application server 224 may provide content metadata, such as lists or categories of content. Also, application server 224 may authenticate a user who desires to purchase, rent, or subscribe to digital or physical content. In one implementation, the interactions between application server 224 and client device 260 may be performed using hypertext transfer protocol (HTTP) or secure HTTP (HTTPS) via public network 280.

Orchestration server 140 may include one or more network devices, or other types of computation or communication devices (e.g., a server device, an application server device, a Web server device, a database server device, a computer, etc.), to link client devices 260 with other devices/services in network 200, such as devices in VCMS 210, devices in data center 220, profile server 230, billing server 240, etc. In one implementation, orchestration server 140 may store a mapping configuration file to associate client type profiles with particular delivery profiles for media content. Orchestration server 140 may receive, from a client device 260, a request for a link to a content selection and may construct a uniform resource locator (URL) that provides the link to the content selection with formatting that is suitable for the particular client device 260. Orchestration server 140 is described further in connection with, for example, FIGS. 4-7.

Profile server 230 may include one or more network devices, or other types of computation or communication devices, to store user profile information for users (e.g., users of client devices 260). The user profile information may include various information regarding a user, such as login information (e.g., a user identifier and a password), billing information, address information, types of services to which the user has subscribed, a list of digital/physical content purchased by the user, a list of video content rented by the user, a list of video content to which the user has subscribed, a client device identifier (e.g., a media player identifier, a mobile device identifier, a set top box identifier, a personal computer identifier) for client device 260, a video application identifier associated with the video application obtained from application server 224, or the like. Application server 224 may use the user profile information from profile server 230 to authenticate a user and may update the user profile information based on the user's activity (e.g., with a user's express permission).

Billing server 240 may include one or more network devices, or other types of computation or communication devices, to manage charging users for services provided via network 200. Billing server 240 may include, for example, a payment processing component, a billing component, and/or a settlement component.

Physical asset distribution system 250 may include one or more network devices, or other types of computation or communication devices, to track availability of physical content (e.g., DVDs, Blu-ray discs, memory cards, etc.) and provide metadata of physical content for inclusion in catalog information provided to users of client devices 260. In one implementation, physical asset distribution system 250 may also provide physical asset information, such as location information, so that when a user wants to buy/rent a physical asset, the system can direct the user to the nearest geographic location (e.g., to retrieve the physical asset).

VCMS 210, content delivery system 212, DRM server 214, data center 220, catalog server 222, application server 224, profile server 230, billing server 240, physical asset distribution system 250, and orchestration server 140 may be referred to herein generally as backend servers.

Client device 260 may include a computation or communication device to enable a user to view video content or interact with another client device 260 or a video display device (e.g., a set-top box and/or television). Client device 260 may include, for example, user devices 110 and 120 of FIG. 1. In other implementations, client device 260 may generally include a personal communications system (PCS) terminal (e.g., a smart phone that may combine a cellular radiotelephone with data processing and data communications capabilities), a tablet computer, a smart phone, a personal computer, a laptop computer, a gaming console, a vehicular communication system, an Internet television, a digital video recorder (DVR) rental terminal, or other types of computation or communication devices. In one implementation, client device 260 may include a client-side application that enables client device 260 to communicate with, for example, VCMS 210 or data center 220 and present information received from VCMS 210/data center 220 to a user. The client-side application may permit a user of client device 260 to log into an account (e.g., via application server 224), access catalog information (e.g., from catalog server 222), submit an order, and/or consume live streaming or downloaded video content (e.g., from VCMS 210).

Private network 270 may include, for example, one or more private IP networks that use a private IP address space. Private network 270 may include a local area network (LAN), an intranet, a private wide area network (WAN), etc. In one implementation, private network 270 may implement one or more Virtual Private Networks (VPNs) for providing communication between, for example, any of VCMS 210, data center 220, profile server 230, billing server 240, and/or physical asset distribution system 250. Private network 270 may be protected and/or separated from other networks, such as public network 280, by a firewall. Although shown as a single element in FIG. 2, private network 270 may include a number of separate networks.

Public network 280 may include a local area network (LAN), a wide area network (WAN), such as a cellular network, a satellite network, a fiber optic network, or a combination of the Internet and a private WAN, etc. that is used to transport data. Although shown as a single element in FIG. 2, public network 280 may include a number of separate networks that provide services to client devices 260.

Although FIG. 2 shows exemplary components of network 200, in other implementations, network 200 may include fewer components, different components, differently-arranged components, and/or additional components than those depicted in FIG. 2. Alternatively, or additionally, one or more components of network 200 may perform one or more tasks described as being performed by one or more other components of network 200. For example, in one implementation, the functions of orchestration server 140, catalog server 222, and/or application server 224 may be combined in a single device or distributed among a group of devices.

Figure 3:
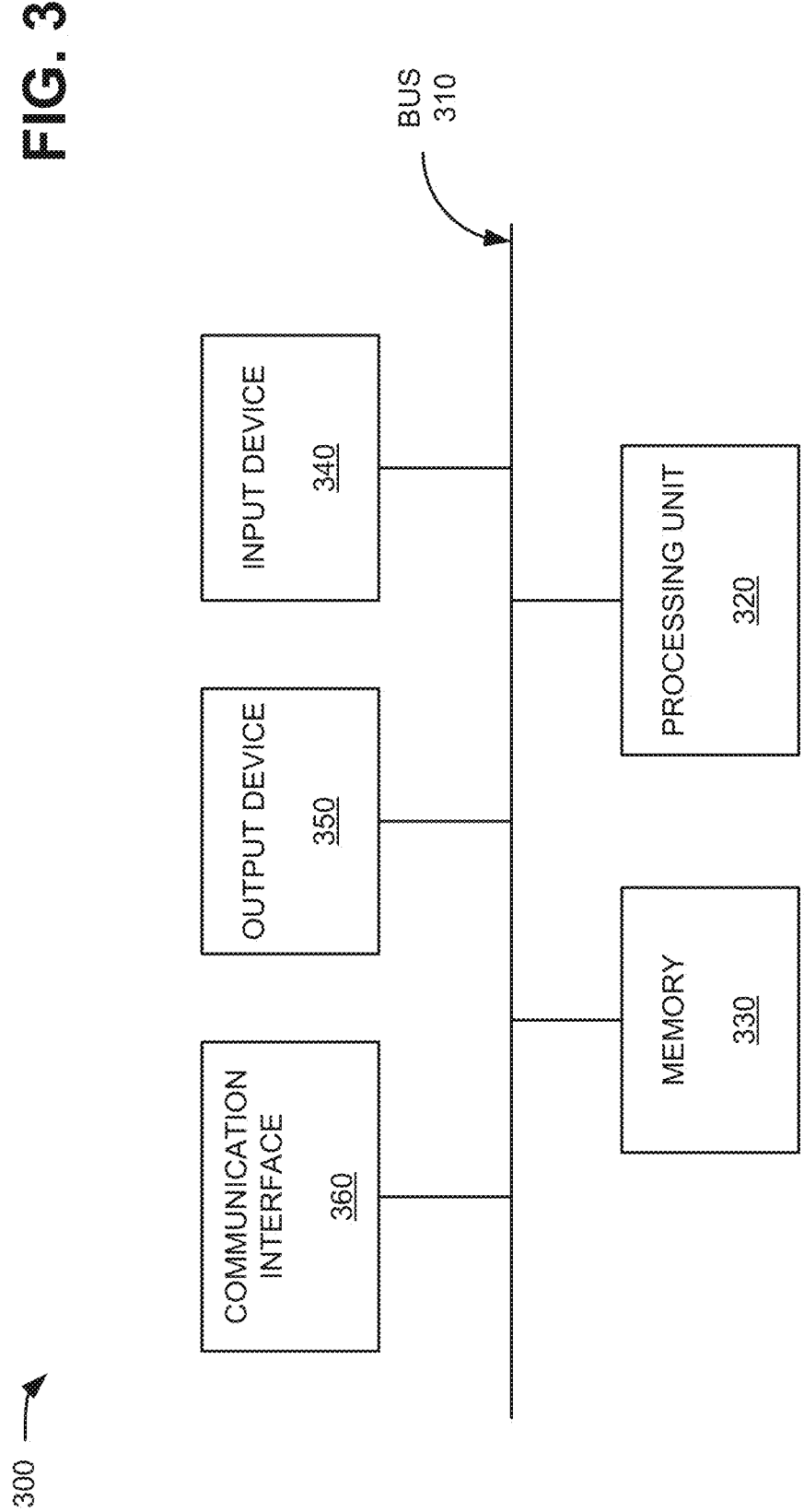
FIG. 3 is a diagram of exemplary components of one or more of the devices of the network depicted in FIG. 2.

FIG. 3 is a diagram of example components of a device 300 that may correspond to any one of the components, devices, or systems of network 200. Each of VCMS 210, content delivery system 212, DRM server 214, data center 220, catalog server 222, application server 224, profile server 230, billing server 240, physical asset distribution system 250, client device 260, and orchestration server 140 may be implemented/installed as a combination of hardware and software on one or more of devices 300. As illustrated, device 300 may include a bus 310, a processing unit 320, a memory 330, an input device 340, an output device 350, and a communication interface 360.

Bus 310 may permit communication among the components of device 300. Processing unit 320 may include one or more processors or microprocessors that interpret and execute instructions. In other implementations, processing unit 320 may be implemented as or include one or more application specific integrated circuits (ASICs), field programmable gate arrays (FPGAs), or the like.

Memory 330 may include a random access memory (RAM) or another type of dynamic storage medium that stores information and instructions for execution by processing unit 320, a read only memory (ROM) or another type of static storage medium that stores static information and instructions for processing unit 320, and/or some other type of magnetic or optical recording medium and its corresponding drive for storing information and/or instructions.

Input device 340 may include a device that permits an operator to input information to device 300, such as a keyboard, a keypad, a mouse, a pen, a microphone, one or more biometric mechanisms, and the like. Output device 350 may include a device that outputs information to the operator, such as a display, a speaker, etc.

Communication interface 360 may include any transceiver-like mechanism that enables device 300 to communicate with other devices and/or systems. For example, communication interface 360 may include mechanisms for communicating with other devices, such as other components of network 200.

As described herein, device 300 may perform certain operations in response to processing unit 320 executing software instructions contained in a computer-readable medium, such as memory 330. A computer-readable medium may include a non-transitory memory device. A memory device may include space within a single physical memory device or spread across multiple physical memory devices. The software instructions may be read into memory 330 from another computer-readable medium or from another device via communication interface 360. The software instructions contained in memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows exemplary components of device 300, in other implementations, device 300 may include fewer components, different components, differently arranged components, or additional components than depicted in FIG. 3. As an example, in some implementations, input device 340 and/or output device 350 may not be implemented by device 300. In these situations, device 300 may be a "headless" device that does not explicitly include an input or an output device. Alternatively, or additionally, one or more components of device 300 may perform one or more other tasks described as being performed by one or more other components of device 300.

Figure 4:
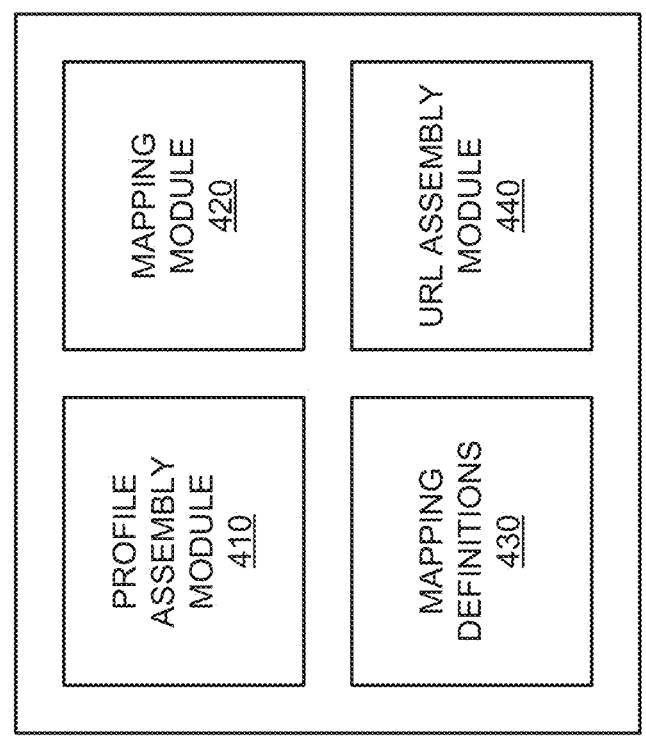
FIG. 4 is a block diagram of exemplary functional components of the orchestration server of FIGS. 1 and 2.

FIG. 4 is a block diagram of exemplary functional components of orchestration server 140. In one implementation, the functions described in connection with FIG. 4 may be performed by one or more components of device 300 (FIG. 3). As shown in FIG. 4, orchestration server 140 may include a profile assembly module 410, a mapping module 420, mapping definitions 430, and a URL assembly module 440.

Profile assembly module 410 may receive sets of parameters from client devices 260 and may assemble the parameters into client type profiles. Each set of parameters may be assembled into a corresponding client type profile for the requesting client device 260. Parameters received from client device 260 may include, for example, a customer identifier, a content identifier, a type of device, access configurations, and a content format for a particular viewing session. The customer identifier may include a unique alpha-numeric sequence for a particular user (e.g., of client device 260). The content identifier may include a unique alpha-numeric sequence for a particular content selection. The type of device may include a pre-defined description code for a type of client device. The pre-defined codes may include a make and a model descriptor. Makes may include, for example, IPA for an iPad, ANP for an Android phone, ANT for an Android tablet, etc. Models may include, for example, versions of particular device models (e.g., 3, 4S, Galaxy, Droid, etc.). The access configurations may include an access capability (e.g., 3G, 4G, Wi-Fi, etc.) of client device 260. The content format may include, for example, an indicator for the desired method of content delivery (e.g., streaming or download). In one implementation, profile assembly module 410 may concatenate some or all parameters received from client device 260 into a client profile string.

Mapping module 420 may receive a client type profile from profile assembly module 410 and may map the client type profile to a corresponding delivery profile. For example, mapping module 420 may perform a lookup of the client type profile in mapping definitions 430 to find a corresponding delivery profile. In one implementation, a single delivery profile may be applicable to multiple client type profiles.

Mapping definitions 430 may include a collection of all the mappings between each client type profile and each delivery profile. Mapping definitions 430 may include a table, database, XML file, or another type of data structure. For example, a network administrator may create a file to associate each client type profile with a particular delivery profile. In one implementation, mapping definitions 430 may be updated/changed such that lookups by mapping module 420 may be affected as soon as changes to mapping definitions 430 are entered and/or stored. FIG. 5 provides an example of a format 500 for a mapping definition that may be stored in mapping definitions 430.

As shown in FIG. 5, mapping definition format 500 may include a device specification indicator 510, a client type profile section 520, and a delivery profile section 530. Device specification indicator 510 may indicate a start and stop point to define an individual mapping definition. Client type profile section 520 may include a client type profile in a particular string format. Particularly, in the example of FIG. 5, the client profile string format may include a concatenation of the device spec with access type, a media content quality (e.g., HD/SD), and a download/streaming indication.

Delivery profile section 530 may include a media profile for delivery of content from VCMS 210. Media profiles may include, for example, an adaptive bit rate type and quality such as Apple's HTTP Live Streaming (HLS), Microsoft's Smooth Streaming, or other streaming technologies. Exemplary media profiles for delivery profile section 530 may include "SMOOTH_SD" for smooth streaming in standard definition and "SMOOTH_HD" for smooth streaming in high definition. In some implementations, a media profile may include a sub-profile to designate, for example, different operating systems for a particular streaming type. Thus, a media sub-profile may include a distinction between a group of mobile devices with similar features (e.g., "MOBILE_A") and consumer electronics devices that are Wi-Fi enabled (e.g., "CE_DEVICES"). Exemplary media profiles with sub-profiles for delivery profile section 530 include "HLS_SM_SD.MOBILE_A" for HLS secure media in standard definition for a client device designated in group mobile type A, or "HLS_SM_HD.CE_DEVICES" for HLS secure media in high definition for a client device that is a consumer electronics device.

In one implementation, delivery profile section 530 may include a generic indicator (e.g., "% FORMAT %") to combine two or more mappings into one. For example, rather than specifying HD/SD in a media profile, a particular delivery profile may direct URL assembly module 440 to use the maximum allowed resolution of a particular content selection to construct a URL for access to the selected content (also referred to herein as a "CDN URL" or "Content Delivery Network URL").

Mapping definitions 430 may store a collection of all the mappings between each client type profile and each delivery profile. In one implementation, the mapping definitions may be stored in an XML format a represented in FIG. 6, which shows a portion 600 of a configuration file according to an implementation described herein. As shown in FIG. 6, portion 600 of the configuration file may include multiple instance of mapping definition format 500 where, in some instances, the same delivery profile (e.g., "<Type>") may be applied to more than one client type (e.g., "<Spec>").

Returning to FIG. 4, URL assembly module 440 receive a delivery profile (e.g., identified by mapping module 420) and content selection (e.g., from client device 260) and may generate a CDN URL for access to the selected content. For example, URL assembly module 440 may construct a CDN URL to enable client device 260 to access the selected content from VCMS 210 in an optimal format for client device 260. In one implementation, the CDN URL may be a session-based streaming URL.

Although FIG. 4 shows exemplary functional components of orchestration server 140, in other implementations, orchestration server 140 may include fewer functional components, different functional components, differently-arranged functional components, and/or additional functional components than depicted in FIG. 4. Alternatively, or additionally, one or more functional components of orchestration server 140 may perform one or more other tasks described as being performed by one or more other functional components of orchestration server 140.

FIG. 7 is a diagram of exemplary communications among a portion 700 of network 200. As shown in FIG. 7, network portion 700 may include orchestration server 140, three different client devices 260 (indicated as client devices 260-1, 260-2 and 260-3), and VCMS 210. The particular arrangement and number of components of network portion 700 are illustrated for simplicity. In practice there may be more client devices 260, orchestration servers 140, and/or VCMS 210.

Communications in FIG. 7 may include communications to manage to content presentation requests from client devices 260. Client devices 260 may each include different front-end client applications that are configured to generate requests for content from orchestration server 140. In examples described herein, client device 260-1 may include a mobile device operating system (e.g., Google's Android OS, etc.) over a Wi-Fi network; client device 260-2 may include a laptop computer using a full-featured web browser/operating system over an Ethernet connection; and client device 260-3 may include a tablet operating system (e.g., Apple's iOS) over a 3G network.

Referring to FIG. 7, client device 260-1 may generate a get request 710 (e.g., in response to a user's selection of particular media content to purchase/rent). Get request 710 may include a call to particular application program interface (API) of orchestration server 140. FIG. 8 provides an example of get request 710 that may correspond to a particular content request from client device 260-1. Get request 710 may include parameters, such as user information, selected content information, and device information in pre-defined (or standardized) formats (e.g., defined within a client application of client device 260 and/or consistent with standardized formats used in mapping definitions 430). In one implementation, get request 710 may include parameters that can be subsequently assembled into a client type profile. In another implementation, get request 710 may include a complete client type profile (e.g., such that construction of a client type profile by profile assembly module 410 would not be needed).

User information of get request 710 may include, for example, a user identifier or account number (e.g., "PartnerCustomerNumber" of FIG. 8). Content information may include, for example, a unique content identifier and/or content source for a user's particular selection from a catalog (e.g., "PurchaseOptionID" of FIG. 8). Device information in get request 710 may include a device identifier (e.g., "DeviceID" of FIG. 8), a device configuration (e.g., "DeviceSpec" of FIG. 8), and a distribution method (e.g., "download" of FIG. 8) selected by client device 260 for a particular viewing session. In one implementation, get request 710 may also include transaction information, such as a unique transaction identifier, transaction time, etc. In the example of FIG. 7, particular parameters of client device 260-1 included in get request 710 may correspond to a Samsung Galaxy tablet (e.g., "GALAXY") using an Android operating system (e.g., "ANT") and connecting to orchestration server 140 via Wi-Fi signals (e.g., "WIFI").

Orchestration server 140 may receive get request 710. Orchestration server 140 (e.g., profile assembly module 410) may extract parameters from get request 710 to construct a client type profile that corresponds to get request 710. In one aspect, the client type profile may include the device type, the access type (e.g., WiFi, 3G, or 4G), and the delivery type (e.g., streaming or download) concatenated in a particular order. For example, based on get request 710 from client device 260-1, the client type profile may be constructed as "ANT_GALAXY_WIFI_streaming."

Based on the constructed client type profile, orchestration server 140 may map the client type profile to a corresponding delivery profile. For example, orchestration server 140 (e.g., mapping module 420) may perform a lookup of "ANT_GALAXY_WIFI_streaming" in mapping definitions 430 to find a corresponding delivery profile. In one implementation, a single delivery profile may be applicable to multiple client type profiles. In one aspect, applying the client type profile "ANT_GALAXY_WIFI_streaming" to the configuration portion 600 of FIG. 6, mapping module 430 may map to the delivery profile "HLS_SM_SD.mobile_A."

Orchestration server 140 may apply the delivery profile to the content identifier from get request 710 to construct a CDN URL to enable client device 260-1 to access the selected content from VCMS 210 in an optimal format for client device 260-1. Orchestration server 140 may provide the CDN URL to client device 260-1 as part of a get response 715. In one implementation, get response 715 may include the CDN URL and other information to enforce digital rights management (e.g., tokens, expiration periods, entitlement codes, etc.). Client device 260-1 may use the CDN URL from get response 715 to retrieve the selected content identified in get request 710, as indicated by reference number 740. FIG. 9 provides an example get response 715 that may correspond to the particular get request from client device 260-1.

In a similar manner to that described above for client device 260-1, client device 260-2 may provide a get request 720 to orchestration server 140. Based on characteristics of client device 260-2, get request 720 may include a user identifier, a unique content identifier, and device information. In the example of FIG. 7, particular parameters of client device 260-2 included in get request 720 may correspond to a PC using a web browser (e.g., "WEB") and connecting to orchestration server 140 via a wired connection.

Orchestration server 140 (e.g., profile assembly module 410) may extract parameters from get request 720 to construct a client type profile that corresponds to get request 720. For example, based on get request 720, the client type profile for client device 260-2 may be constructed as "WEB_streaming." Using the exemplary configuration portion 600 of FIG. 6, orchestration server 140 (e.g., mapping module 420) may perform a lookup of "WEB_streaming" in mapping definitions 430 to find the corresponding delivery profile, "SMOOTH_% format %." Orchestration server 140 may apply the delivery profile to the content identifier from get request 720 to construct a CDN URL to enable client device 260-2 to access the selected content from VCMS 210, and may provide the CDN URL to client device 260-2 as part of get response 725. Client device 260-2 may use the CDN URL from get response 725 to retrieve the selected content identified in get request 720, as indicated by reference number 745.

Also similarly, client device 260-3 may provide a get request 730 to orchestration server 140. Based on characteristics of client device 260-3, get request 730 may include a user identifier, a unique content identifier, and device information. In the example of FIG. 7, particular parameters of client device 260-3 included in get request 730 may correspond to an iPhone (e.g., "IPH") with an unspecified or older model number (e.g., "DEFAULT") connecting to orchestration server 140 via a 3G cellular network (e.g., "3G").

Orchestration server 140 (e.g., profile assembly module 410) may extract parameters from get request 730 to construct a client type profile that corresponds to get request 730. For example, based on get request 730, the client type profile for client device 260-3 may be constructed as "IPH_DEFUALT_3G_download." Using the exemplary configuration portion 600 of FIG. 6, orchestration server 140 (e.g., mapping module 420) may perform a lookup of "IPH_DEFUALT_3G_download" in mapping definitions 430 to find the corresponding delivery profile, "IPHONE." Orchestration server 140 may apply the delivery profile to the content identifier from get request 730 to construct a CDN URL to enable client device 260-3 to access the selected content from VCMS 210, and may provide the CDN URL to client device 260-3 as part of get response 730. Client device 260-3 may use the CDN URL from get response 735 to retrieve the selected content identified in get request 710, as indicated by reference number 750.

Although FIG. 7 shows example components of network portion 700, in other implementations, network portion 700 may include fewer components, different components, differently arranged components, and/or additional components than depicted in FIG. 7. Alternatively, or additionally, one or more components of network portion 700 may perform one or more other tasks described as being performed by one or more other components of network portion 700.

FIG. 10 is a flow chart of an exemplary process 1000 for mapping a content delivery profile to a requesting client device type, according to an implementation described herein. In one implementation, process 1000 may be performed by orchestration server 140. In another implementation, some or all of process 1000 may be performed by another device or group of devices, including or excluding orchestration server 140.

As illustrated in FIG. 10, process 1000 may include receiving and/or storing a mapping configuration for delivering media content to different client devices (block 1010). For example, orchestration server 140 may receive a mapping configuration file to associate client type profiles with particular delivery profiles for media content. Orchestration server 140 may store the mapping configuration file as mapping definitions 430.

Process 1000 may include receiving a get request from a client device for a particular content selection (block 1020). For example, orchestration server 140 may receive, from a client device 260, a request (e.g., get request 710) for a link to a particular content selection. The request may include a content identifier and parameters for the client device, such as indicators for a type of client device 260, indicators of an operating system for client device 260, indicators for an access type (e.g., 3G, 4G, Wi-Fi, etc.) used by client device 260, and/or an indicator for a desired method of content delivery (e.g., streaming/download). In another implementation, the request may include parameters in the form of a complete client type profile (e.g., consistent with client type profile section 520).

Process 1000 may include constructing a client type profile (block 1030), and mapping the client type profile to (block 1040). For example, if get request 710 does not include a complete client type profile, orchestration server 140 may construct, based on the parameters for client device 260, a particular client type profile. In one aspect, the particular client type profile may be configured to match a standard format (e.g., client type profile section 520) used in the client type profiles of the mapping definitions 430. Orchestration server 140 may map the particular client type profile to one of the particular delivery profiles in the mapping definitions 430.

Process 1000 may also include constructing a CDN URL based on the delivery profile and the selected content (block 1050). For example, orchestration server 140 may construct a URL based on the particular delivery profile previously mapped to the client type profile of client device 260 and the content identifier from get request 710. The URL may provide a link to the selected content with formatting that is suitable for the particular client type profile of client device 260.

Process 1000 may further include generating and sending a response to the get request that includes the CDN URL (block 1060). For example, orchestration server 140 may generate a response (e.g., get response 715) that includes include the CDN URL along with other information to enforce digital rights management for the selected content. Orchestration server 140 may provide the response to client device 260.

Systems and/or methods described herein may store a mapping configuration to associate client type profiles with particular delivery profiles for media content and may receive, from a client device, a request for a link to a content selection. The request may include a content identifier and parameters for the client device. The systems and/or methods may construct, based on the parameters for the client device, a particular client type profile and maps the particular client type profile to one of the particular delivery profiles in the mapping configuration. The systems and/or methods may construct a uniform resource locator (URL), based on the one of the particular delivery profiles and the content identifier, that provides the link to the content selection with formatting that is suitable for the particular client type profile and may send the URL to the client device.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments. Further, while a series of blocks have been described with respect to FIG. 10, the order of the blocks may be varied in other implementations. Moreover, non-dependent acts may be implemented in parallel. Additionally, other processes described in this description may be varied and/or acts performed in parallel.

It will also be apparent that various features described above may be implemented in many different forms of software, firmware, and hardware in the implementations illustrated in the figures. The actual software code or specialized control hardware used to implement the various features is not limiting. Thus, the operation and behavior of the features of the invention were described without reference to the specific software code—it being understood that one would be able to design software and control hardware to implement the various features based on the description herein.

Further, certain features described above may be implemented as "logic" that performs one or more functions. This logic may include hardware, such as one or more processors, microprocessors, application specific integrated circuits, or field programmable gate arrays, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method implemented by a network device, the method comprising:
   storing, at the network device, a mapping configuration file to associate client profile strings with particular delivery profiles for media content;
   receiving, from a client device, a request for a link to access a content selection, wherein the request includes a content identifier and parameters for the client device;
   constructing, by the network device and from the parameters for the client device that were received from the client device, a particular client profile string that matches one of the client profile strings in the mapping configuration file stored at the network device, wherein constructing the particular client profile string includes concatenating two or more of the parameters for the client device into the particular client profile string;

mapping the particular client profile string to one of the particular delivery profiles in the mapping configuration file;

constructing a uniform resource locator (URL) that includes the one of the particular delivery profiles and the content identifier, wherein the URL provides the link to access the content selection in a format that is suitable for the client device; and sending, to the client device, the URL.

2. The method of claim 1, wherein the parameters for the client device included in the request are provided in a format that is defined to match a format used in the client profile strings of the mapping configuration file.

3. The method of claim 1, wherein the delivery profiles include:
one or more adaptive bit rate (ABR) streaming profiles, and
one or more download profiles that differentiate between streaming and downloading.

4. The method of claim 1, wherein the parameters for the client device included in the request comprise indicators for a type of the client device.

5. The method of claim 4, wherein the parameters for the client device included in the request further comprise indicators for an access type used by the client device and an operating system for the client device.

6. The method of claim 5, wherein the parameters for the client device included in the request further comprise an indicator for a desired method of content delivery.

7. The method of claim 6, wherein the client device is one of:
a personal communications system (PCS) terminal,
a tablet computer,
a smart phone,
a personal computer,
a laptop computer,
a gaming console,
a vehicular communication system,
an Internet television, or
a digital video recorder (DVR) rental terminal.

8. The method of claim 1, wherein mapping the particular client profile string to one of the particular delivery profiles in the mapping configuration file comprises:
identifying the particular client profile string in the mapping configuration file, and
selecting, from the mapping configuration file, the one of the particular delivery profiles associated with the particular client profile string.

9. The method of claim 1, wherein the content identifier included in the request comprises a content quality indication and wherein the URL includes the content quality indication.

10. The method of claim 1, further comprising:
receiving a change to the mapping configuration file, wherein the change associates the particular client profile string with a different one of the particular delivery profiles.

11. The method of claim 10, further comprising:
receiving, from another client device, another request for a link to the content selection, wherein the request includes the content identifier and the parameters;
constructing, based on the parameters, the particular client profile string;

mapping the particular client profile string to the different one of the particular delivery profiles in the mapping configuration file;
constructing another URL based on the different one of the particular delivery profiles and the content identifier, wherein the other URL provides the link to the content selection with different formatting that is suitable for the other client device; and
sending, by the network device and to the other client device, the other URL.

12. A network device, comprising:
a memory configured to store instructions; and
a processor configured to execute instructions in the memory to:
store, in the memory, a mapping configuration to associate client profile strings with particular delivery profiles for media content;
receive, from a client device, a request for a link to access a content selection, wherein the request includes a content identifier and a particular client profile string for the client device, wherein the particular client profile string is constructed by concatenating two or more parameters for the client device into the particular client profile string;
map the particular client profile string to one of the particular delivery profiles in the mapping configuration;
construct a uniform resource locator (URL) that includes the one of the particular delivery profiles and the content identifier, wherein the URL provides the link to access the content selection in a format that is suitable for the client device; and
send, to the client device, the URL.

13. The network device of claim 12, wherein the delivery profiles include:
a HTTP Live Streaming (HLS) standard definition (SD) delivery profile,
a HLS high definition (HD) delivery profile, and
a combined HLS SD/HD delivery profile.

14. The network device of claim 12, wherein parameters for the client device included in the request comprise indicators for a type of the client device and an operating system for the client device.

15. The network device of claim 14, wherein the parameters for the client device included in the request further comprise indicators for an access type used by the client device and a desired method of content delivery.

16. The network device of claim 12, where the processor is further configured to:
receive an update to the mapping configuration, wherein the update associates the particular client profile string with a different one of the particular delivery profiles, and
store, in the memory, updated mapping configuration.

17. A non-transitory computer-readable medium, including instructions executable by at least one processor, the computer-readable medium comprising one or more instructions for:
receiving a mapping configuration file to associate client profile strings with particular delivery profiles for media content;
receiving, from a client device, a request for a link to access a content selection, wherein the request includes a content identifier and parameters for the client device;
constructing, from the parameters for the client device that were received from the client device, a particular client profile string that matches one of the client profile strings in the mapping configuration file, wherein constructing the particular client profile string includes concatenating two or more of the parameters for the client device into the particular client profile string;

mapping the particular client profile string to one of the particular delivery profiles in the mapping configuration file;

constructing a uniform resource locator (URL) that includes the one of the particular delivery profiles and the content identifier, wherein the URL provides the link to access the content selection in a format that is suitable for the client device; and sending the URL to the client device.

18. The non-transitory computer-readable medium of claim 17, wherein the delivery profiles include:
one or more adaptive bit rate (ABR) streaming profiles, and
one or more downloading profiles.

19. The non-transitory computer-readable medium of claim 18, wherein the one or more ABR streaming profiles include:
a HTTP Live Streaming (HLS) standard definition (SD) delivery profile,
a HLS high definition (HD) delivery profile,
a Smooth Streaming SD delivery profile, and
a Smooth Streaming HD delivery profile.

* * * * *